(12) United States Patent
Albiez

(10) Patent No.: US 11,001,007 B2
(45) Date of Patent: May 11, 2021

(54) METHOD FOR FIXING A CONNECTION OF A SUPPLY TUBE TO AN OPW AIRBAG, IN PARTICULAR IN A VEHICLE RESTRAINT SYSTEM

(71) Applicant: Global Safety Textiles GmbH, Maulburg (DE)

(72) Inventor: Daniel Albiez, Murg (DE)

(73) Assignee: GLOBAL SAFETY TEXTILES GMBH, Maulburg (DE)

( * ) Notice: Subject to any disclaimer, the term of this patent is extended or adjusted under 35 U.S.C. 154(b) by 45 days.

(21) Appl. No.: 16/550,529

(22) Filed: Aug. 26, 2019

(65) Prior Publication Data

US 2020/0070428 A1 Mar. 5, 2020

(30) Foreign Application Priority Data

Aug. 28, 2018 (DE) ...................... 10 2018 006 829.4

(51) Int. Cl.
| | |
|---|---|
| *B29C 65/02* | (2006.01) |
| *B60R 21/262* | (2011.01) |
| *B29D 23/00* | (2006.01) |
| *B29D 22/02* | (2006.01) |
| *B29C 65/00* | (2006.01) |

(52) U.S. Cl.
CPC ........ *B29C 65/02* (2013.01); *B29C 66/53262* (2013.01); *B29C 66/612* (2013.01); *B29C 66/63* (2013.01); *B29D 22/02* (2013.01); *B29D 23/003* (2013.01); *B60R 21/262* (2013.01)

(58) Field of Classification Search
CPC ............ B60R 21/262; B20C 66/53262; B20C 66/53261; B20C 66/4742; B20C 66/612; B20C 66/63; B29B 13/025
See application file for complete search history.

(56) References Cited

U.S. PATENT DOCUMENTS

| | | | |
|---|---|---|---|
| 6,883,557 B1 * | 4/2005 | Eschbach ................. | D03D 1/02 139/387 R |
| 2015/0367807 A1 * | 12/2015 | Becker .................... | D03D 11/02 280/743.1 |
| 2020/0101929 A1 * | 4/2020 | Albiez .................. | B60R 21/235 |

FOREIGN PATENT DOCUMENTS

| | | | |
|---|---|---|---|
| DE | 102013009723 A1 | 12/2014 | |
| DE | 102013015628 A1 | 3/2015 | |

* cited by examiner

*Primary Examiner* — Barbara J Musser
(74) *Attorney, Agent, or Firm* — Pearne & Gordon LLP

(57) ABSTRACT

Device for fixing a connection to an OPW airbag, with an expansion sleeve (2), with a plurality of expansion shells (4), and a mandrel (6) extending longitudinally through the expansion sleeve (2) having a stretching piece (8) arranged in the vicinity of the expansion shells (4), the outer diameter of which stretching piece is greater than the inner diameter of the expansion shells (4).

2 Claims, 6 Drawing Sheets

METHOD FOR FIXING A CONNECTION OF A SUPPLY TUBE TO AN OPW AIRBAG, IN PARTICULAR IN A VEHICLE RESTRAINT SYSTEM

The present invention relates to a device and a method for fixing a connection of a supply tube to an OPW airbag, in particular in a vehicle restraint system.

Inflatable airbags, such as are used in the automotive sector, e.g. referred to as driver or side airbags and side curtain bags, have to be connected to a source of air or gas, frequently a gas generator, from where they are fed or supplied by way of supply tubes, for example. To achieve a stable connection between an airbag and a supply tube for use in the automotive sector, according to a first proposed solution, airbags are provided in the connection region with hard connection fittings that are inserted into their connection mouth and joined to the supply tube, being secured at such fittings against the generator connection slipping off. This is necessary due to the high dynamic forces exerted during the inflation process and is achieved as standard using hose clips or other mechanical connections.

In addition, according to a second proposed solution, connections on supply tubes, which are merely inserted into the connection mouth and are held in position by their frictional forces in relation to the airbag material, are used in custom-made airbags. Such airbags, for example, are referred to as pre-crash airbags; they generally have a smaller volume and are provided with smaller size connections (approx. 6-8 mm in diameter).

Compared to the front or side airbags only suitable for one-time use, these airbags are designed for multiple use. Thus, these airbag variants are used in vehicle seats for positioning and/or "aligning" vehicle occupants before the actual front or side airbag—which should protect the occupant—is activated. The proposed solution last described here of attaching connections of supply tubes to custom-made—sewn—airbags is very expensive and complicated.

Thus, airbag variants for this purpose are produced with a high level of manufacturing effort, usually by cutting out two identical fabric parts for the upper and lower side of the airbag from a silicone-coated flat fabric. A sealant—in the form of a circumferential bead—is then sprayed onto the edges of these parts. The two fabric parts are subsequently placed on top of each other and joined or glued together. To ensure adequate strength of the bond seam, the fabric parts for the upper and lower side of the airbag are additionally provided with a sewn seam, the connection tube being positioned in the connection region (connection mouth) of the airbag before the two layers of fabric are placed on top of each other and joined. This connection tube is provided in the connection region with the same sealant as for gluing the edges to secure the connection against slipping out. On the one hand, this method is very time- and cost-intensive and, on the other hand, there is only a limited possibility of positioning the connection tube exactly at the connection of the airbag.

As a result, it was considered to replace the sewn airbags with airbags based on the OPW technology. In recent years, however, replacing custom-made airbags with airbags based on the OPW technology failed repeatedly due to the fact that, without additionally securing the connection to the airbag, e.g. using hose clips, it was impossible to achieve adequate strength, safety and reliability for the joint between airbag and supply tube. In addition, due to the very small installation space in vehicle seats, it is impossible or very difficult to use hose clips on OPW airbags.

The invention is now based on the object of proposing a device for fixing a connection of a supply tube to an OPW airbag and a method for fixing a connection of a supply tube to an OPW airbag with which avoids or at least greatly diminishes the drawbacks known in prior art.

The object is initially achieved by a device for fixing a connection to an OPW airbag which is characterised by
 a) an expansion sleeve, having
 b) a plurality of expansion shells, and
 c) a mandrel extending lengthwise through the expansion sleeve having
 d) a stretching piece arranged in the vicinity of the expansion shells, the outer diameter of which stretching piece is greater than the inner diameter of the expansion shells.

With the present invention, there is now the possibility of overcoming the drawbacks known from prior art, for example in such a manner that in future OPW airbags may also be used in the area of vehicle seats. It is possible with the device according to the invention to achieve local spreading of the connection tube in the region of the connection mouth into cavities which exist there and also additionally inside the airbag so that a positive connection can be formed between the connection mouth of the airbag and the supply tube, preventing the supply tube from being pulled out of the connection mouth. This can be made permanently stable by heating the positive connection. It is additionally advantageous that in the event of possible damage to the supply tube, e.g. during installation in the vehicle, the supply tube can easily be removed from the airbag by heating it at the point where it was previously expanded and returning it to its original position with slight pressure. As a result, a damaged or faulty supply hose can be removed from an airbag without damaging the fabric which forms the connection mouth.

In an advantageous embodiment of the invention, the device is characterised in that the expansion sleeve and the mandrel have holding devices which are arranged to be movable relative to each other and fixable against each other. This development of the device according to the invention greatly simplifies its handling. Positioning of the stretching piece in the region of the expansion sleeve can be ensured without any special effort for the period of local heating, deformation and ultimate fixing of the supply tube in the connection mouth.

In a further advantageous embodiment of the invention, the device is characterised in that a heating device is arranged in the region of the expansion shells. The arrangement according to the invention of a heater on the device further simplifies handling compared to a heater to be assigned separately.

In yet another advantageous embodiment of the invention, the device is characterised in that the heating device is designed as induction heating. This embodiment advantageously allows more rapid use of the device according to the invention as the required heat source can be heated up to the required temperature and cooled down again very quickly. This results advantageously in an increase in the process speed.

The object is further achieved by a method for fixing a connection of a supply tube to an OPW airbag, in particular using a device as described above, characterised by the following steps:
 e) inserting and positioning the device in a connection arranged in a connection mouth of the OPW airbag so that the expansion sleeve is located in the region of at least one cavity of the connection mouth, f) heating the connection in the region of the expansion shells, g) moving the stretching piece towards the expansion sleeve in the direction of the expansion shells so that the shells move radially outwards and expand the connection radially in the region of the stretching piece, in such a manner that the connection deforms thermoplastically and retains its expanded deformation on subsequently cooling down.

The method according to the invention allows easy and rapid production of a fixed joint of a connection of a supply tube to an OPW airbag in a very confined space. This saves time and costs compared to the methods known from prior art. The advantageous variant of the method described here leads to the production of one or a plurality of fastenings inside a cavity of the connection mouth.

If this variant is not desirable, the object can additionally be achieved with a method for fixing a connection of a supply tube to an OPW airbag, in particular using a device as described above by the following steps:

e) inserting and positioning the device in a connection arranged in a connection mouth of the OPW airbag and protruding inside said OPW airbag so that the expansion sleeve is located in the region of the portion of the connection protruding inside the OPW airbag, f) heating the connection in the region of the expansion shells, g) moving the stretching piece towards the expansion sleeve in the direction of the expansion shells so that the shells move radially outwards and expand the connection radially in the region of the stretching piece, in such a manner that the connection deforms thermoplastically and retains its expanded deformation on subsequently cooling down.

The advantages are the same as those of the method variant described above but relate to a different position of the fixing, namely at the point when the connection protrudes inside the OPW airbag so that the expansion sleeve and thus the portion of the connection to be expanded is located in the region of the portion of the connection protruding inside the OPW airbag.

To facilitate better understanding of the invention, it will now be briefly described by way of example embodiments with the aid of the drawing, in which: the figures show mainly schematic sectional views.

In the following description, identical components are provided with the same reference numbers insofar as permitted by the overview.

Figure 1:
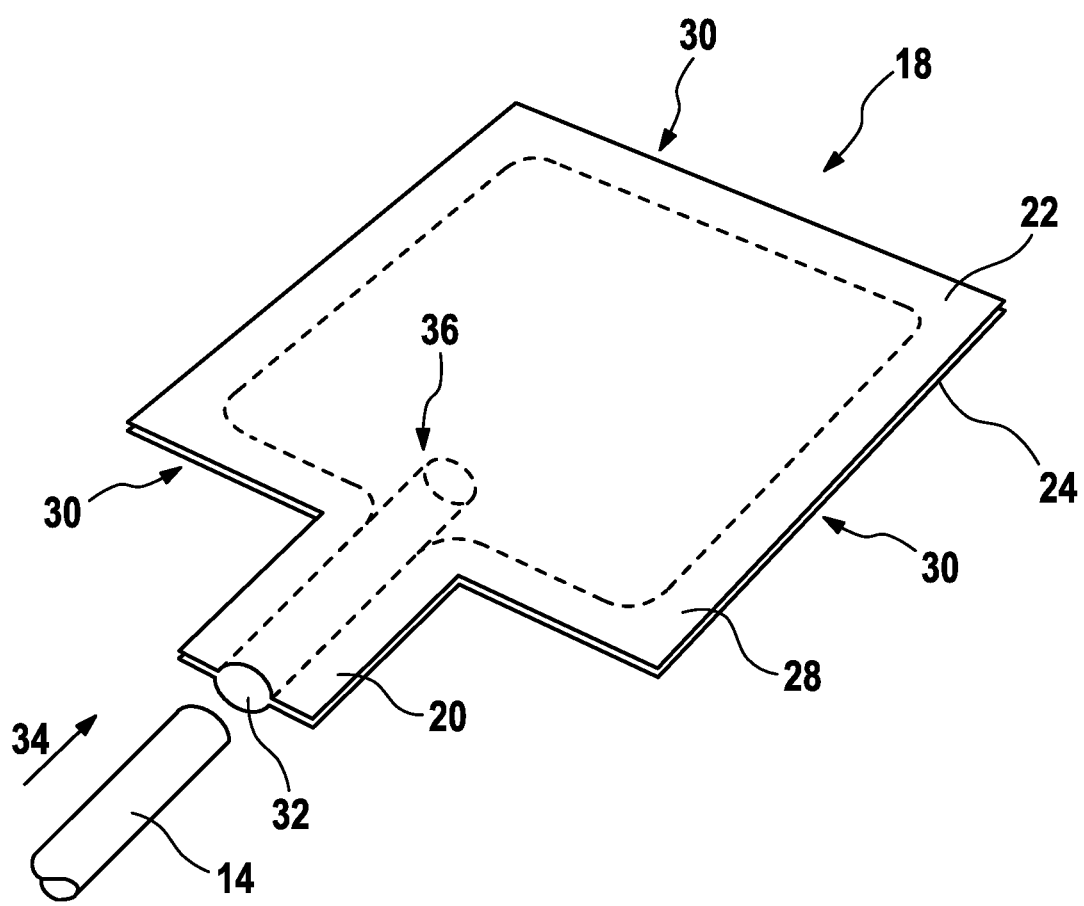
FIG. 1 is a greatly simplified schematic view in perspective of an OPW airbag, ready for the insertion of a connection of a supply tube into the connection mouth of said OPW airbag and a connection, represented broken, before insertion.

FIG. 1 shows an OPW airbag 18 with an upper fabric 22 and a lower fabric 24, ready for the insertion of a connection 14 of a supply tube 26 not shown here (the connection 14, for example, merges as it were into the supply tube 26) into the connection mouth 20 of said OPW airbag 18. The upper fabric 22 and the lower fabric 24 of the OPW airbag 18 are joined together in a single-ply fabric in a so-called woven seam 28 in an edge region 30 (OPW principle). The two layers of fabric 22 and 24 are only shown spaced slightly apart so that they are easier to identify. In the region of the connection mouth 20, the OPW airbag 18 has already been pulled a little apart, resulting in an approximately circular opening 32. The connection 14 should be inserted into the opening 32 in the direction of the arrow 34 to such a depth that its end is located in the position denoted by 36 inside the OPW airbag 18.

The connection mouth 20 of the OPW airbag 18 is formed from the fabric layers 22 and 24 by joining them together into a single-ply fabric layer of the so-called woven seam 28 in the edge region 30. In the application, the OPW airbag is supplied with a filling medium, such as air, gas or fluid, via the supply tube 26 positioned in the connection mouth 20 and is thus brought into the third dimension for expansion.

Figure 2:
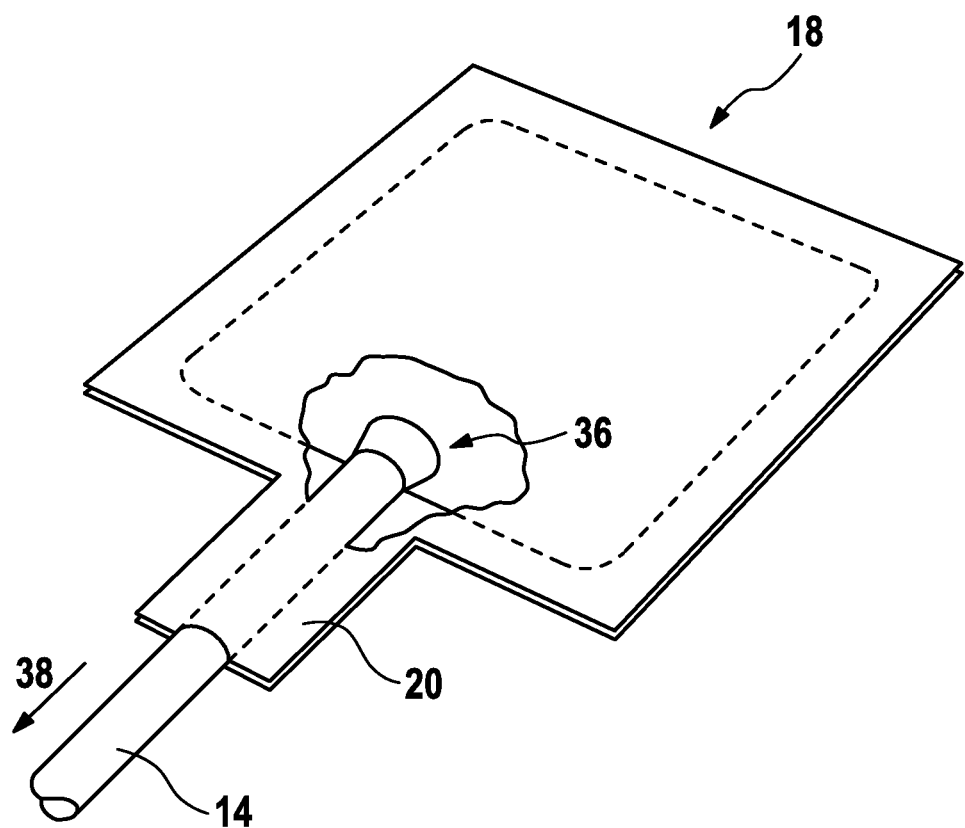
FIG. 2 is a greatly simplified schematic view in perspective of the OPW airbag from FIG. 1 with the connection already inserted.

FIG. 2 shows the OPW airbag 18 with connection 14 already inserted into the connection mouth 20. This result can be seen after using the device according to the invention in accordance with one of the two methods according to the invention. The connection 14 is expanded in the region 36 and is fixed in the airbag 18. It cannot usually be pulled out of the connection mouth 20 in the direction of the arrow 38.

Figure 3:
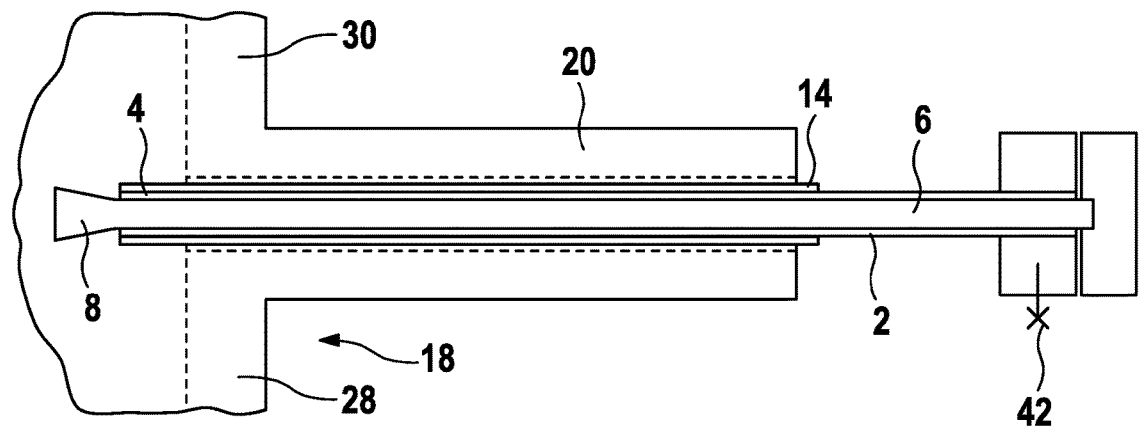
FIG. 3 is a greatly simplified schematic view in the initial position of the device according to the invention, already inserted into the connection mouth of an OPW airbag that is greatly enlarged and differently proportioned compared to FIGS. 1 and 2.
Figure 4:
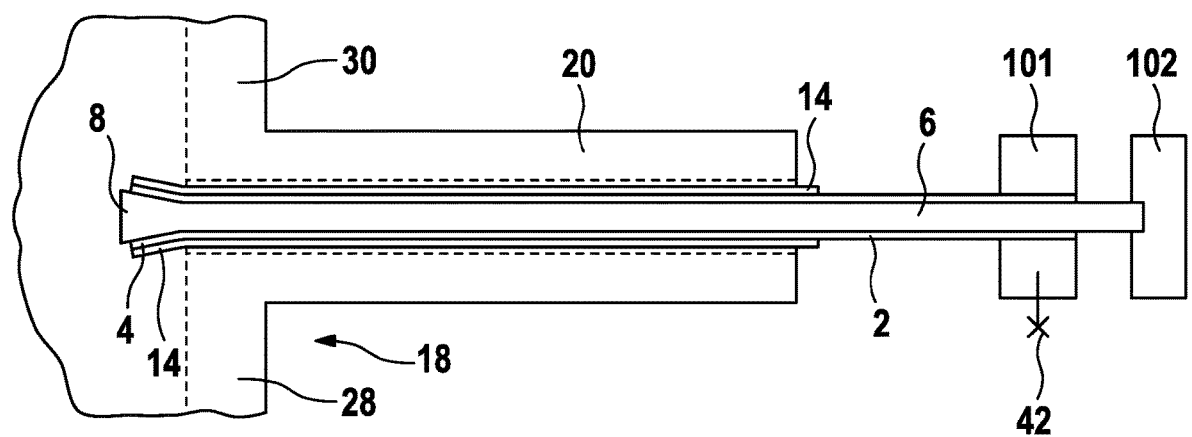
FIG. 4 is a greatly simplified schematic view in the activated state of the device according to the invention similar to FIG. 3, already inserted into the connection mouth of an OPW airbag.

FIG. 3 and FIG. 4 show an example of a device 40 according to the invention, with an expansion sleeve 2, through which a mandrel 6 extends, said mandrel (in FIG. 3) protruding inside the OPW airbag 18 on the left side with a conically expanding stretching piece 8. The connection 14, into which the expansion sleeve 2 is subsequently inserted, is already inserted in the connection mouth 20 and is positioned as shown. On the left-hand end of the expansion sleeve 2 (in FIG. 3), said sleeve is slotted a plurality of times over a short distance in such a manner that resulting resilient expansion shells 4 are moved radially outwards on retracting the mandrel 6 and press the connection 14 outwards in this region. As the connection 14 used here is comprised of thermoplastically deformable material, the expanded end of the connection 14 can be fixed in this state. For this purpose, a heating device 12 (FIG. 9) by means of which the connection 14 is heated is arranged expediently in the region of the expansion shells 4. The mandrel 6 is held in its position until cooled down. The connection 14 thus retains the shape obtained during expansion and heating: the connection 14 is fixed in the OPW airbag 18. Advantageously, the expansion sleeve 2 and mandrel 6 components of the device 40 according to the invention can be moved towards each other via holding devices 101 and 102 and locked in position. For this purpose the mandrel 6 is connected to the holding device 102 and the expansion sleeve 2 to the holding device 101. By way of a fixing device, a screw 42 for example, the mandrel 6 can be clamped in the holding device 101.

The device according to the invention shown in FIG. 3 and FIG. 4 can be used, for example, in accordance with the method according to the invention as follows. The expansion sleeve 2 is firmly connected to the holding device 101 by way of the screw 42. In place of the screw 42, the expansion sleeve 2 can also be attached by means of welding, gluing or similar. The opposing end of the expansion sleeve 2, which is not attached to the holding device 101, has incisions (for example, four slots) in the axial direction which allow the stretching piece 8 to expand the expansion sleeve 2 at this point. A mandrel 6, at whose one end the stretching piece 8 is attached and at whose opposing end the holding device 102 is attached, is movably guided inside the expansion sleeve 2. On the side directed towards the expansion shells 4, the stretching piece 8 is conical to allow uniform expansion of said expansion shells 4. The thinnest outer diameter of the stretching piece 8 corresponds to the inside diameter of the expansion sleeve 2. It enlarges, however, up to the end of the mandrel 6 to approximately the larger diameter shown here.

Since the present patent application describes two alternative methods, they will be dealt with separately below.

The procedure with the result according to FIG. 2 corresponds to a first method. In this case, the supply tube 26 is introduced so far into the connection mouth 20 that it protrudes approximately 5 mm beyond the inner end of the connection mouth 20, the end pointing towards the inflatable chamber of the OPW airbag 18. In the next step, the device according to the invention is inserted so far into the supply tube 26 until the end of the expansion sleeve 2 with its expansion shells 4 lies on a par with the end of the supply tube 26 which points towards the inside of the OPW airbag 18. After positioning the device according to the invention in the connection 14 or supply tube 26, the expansion sleeve 2 which consists, for example, of a magnetic material such as iron is heated in the region of the expansion shells 4, for example by means of a heating device 14 working with induction. The degree of heating of the expansion shells 4 depends on the temperature range of the supply tube 26 made of a thermoplastic material. Preferably, a PA 12 with a melting temperature of approximately 180° C. and a softening temperature of approximately 136° C. is selected for the polymer of which the supply tube 26 is made. The softening temperature values for PA 6.6 materials preferably used for the fabric of the OPW airbag are preferably around approximately 220-236° C., well above the softening temperatures for the polymer of which the supply tube 26 is made.

The deformation of the supply tube 26 itself takes place in the thermoplastic range. After reaching the required temperature, the stretching piece 8 is drawn in by means of the mandrel 6 and the holding block 101 attached thereto through the expansion sleeve 2 into the expansion shells 4. Due to the conical shape of the stretching piece 8 pointing towards the expansion shells 4, as the stretching piece 8 slides into the expansion shells 4, the individual shells move outwards and expand the supply tube 26 at its outer end. The degree of expansion of the supply tube 26 corresponds approximately to the wall thickness of the expansion sleeve 2. In the last step, the mandrel 6 with the stretching piece 8 is moved away from the expansion shells 4 so that the stretching piece 8 slides out of the expansion shells 4 and these can return to their original position. After this, the device according to the invention can be removed from the supply tube 26 completely and without much resistance.

By expanding the supply tube 26 at its end pointing towards the inside of the OPW airbag, the supply tube 26 is prevented from sliding out of the connection mouth 20 without the use of further fastening means.

Figure 5:
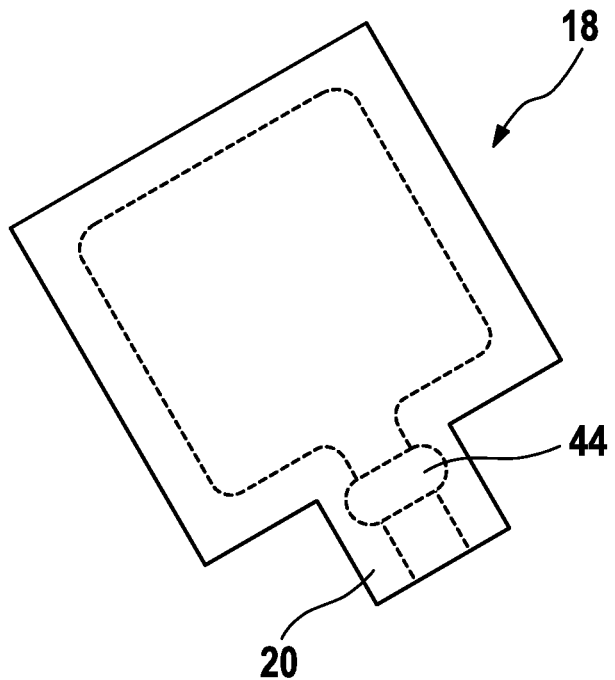
FIG. 5 is a greatly simplified schematic diagram of an OPW airbag in plan view similar to the illustration in FIG. 1 with a pocket woven into the connection mouth.

FIG. 5 shows an OPW airbag with a pocket 44 arranged by way of example in a connection mouth, said pocket having an approximately toroidal design.

Figure 6:
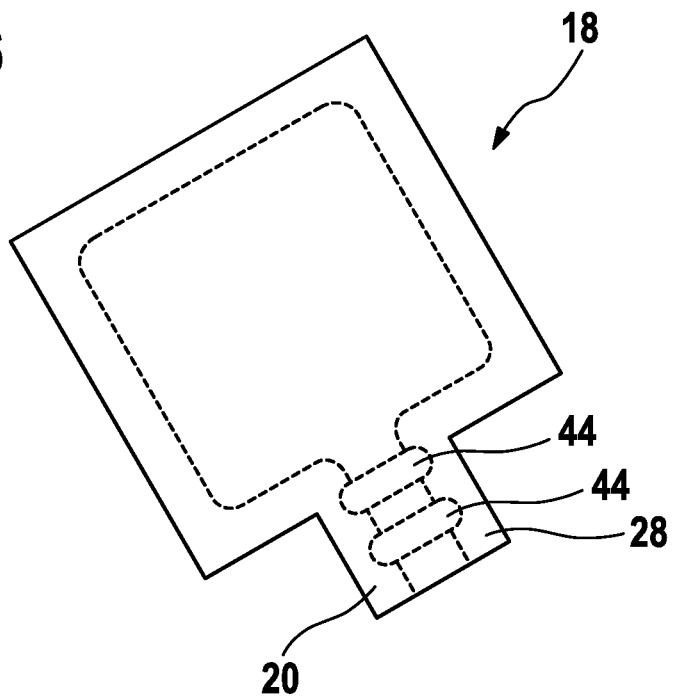
FIG. 6 is a greatly simplified schematic diagram of an OPW airbag in plan view similar to the illustration in FIG. 5 with two pockets woven into the connection mouth.

FIG. 6 shows a further OPW airbag with two pockets 44 arranged by way of example in the connection mouth, said pockets having an approximately toroidal design. Any shape may be chosen for the pockets.

Figure 7:
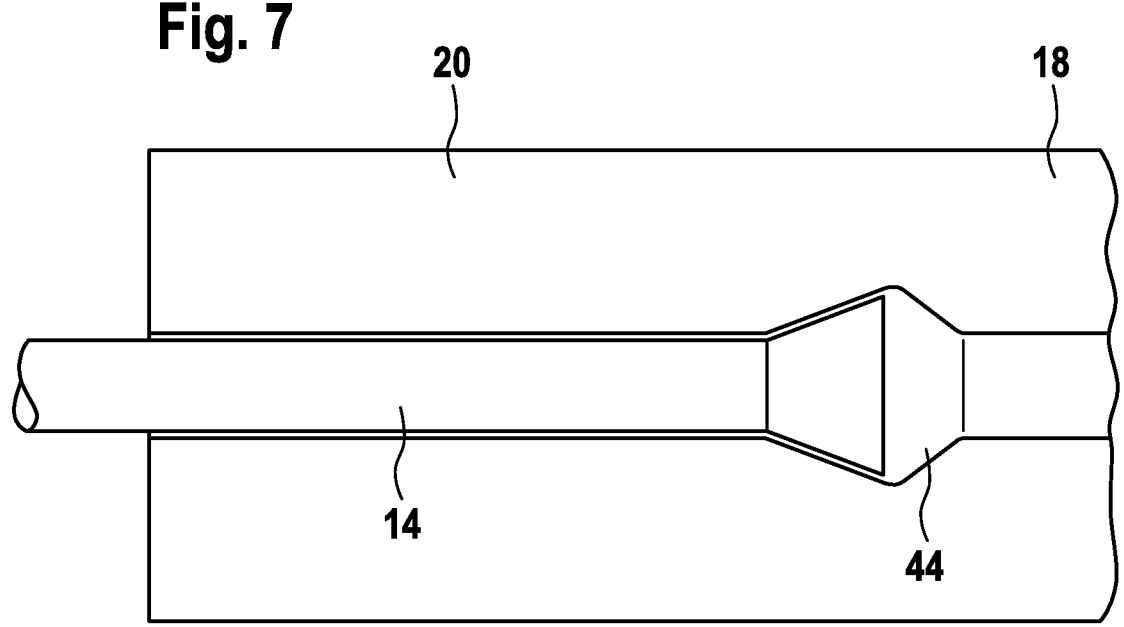
FIG. 7 is a greatly simplified schematic in plan view of a pocket woven into the connection mouth of an OPW airbag with the device according to the invention already activated, the connection being expanded and therefore fixed in the region of the pocket.

FIG. 7 shows a further shape of a pocket 44 which is arranged in a connection mouth 20 of an OPW airbag 18. Here, fixing of the connection 14 in the connection mouth 20 (in FIGS. 7 and 8) has been effected from the left.

Figure 8:
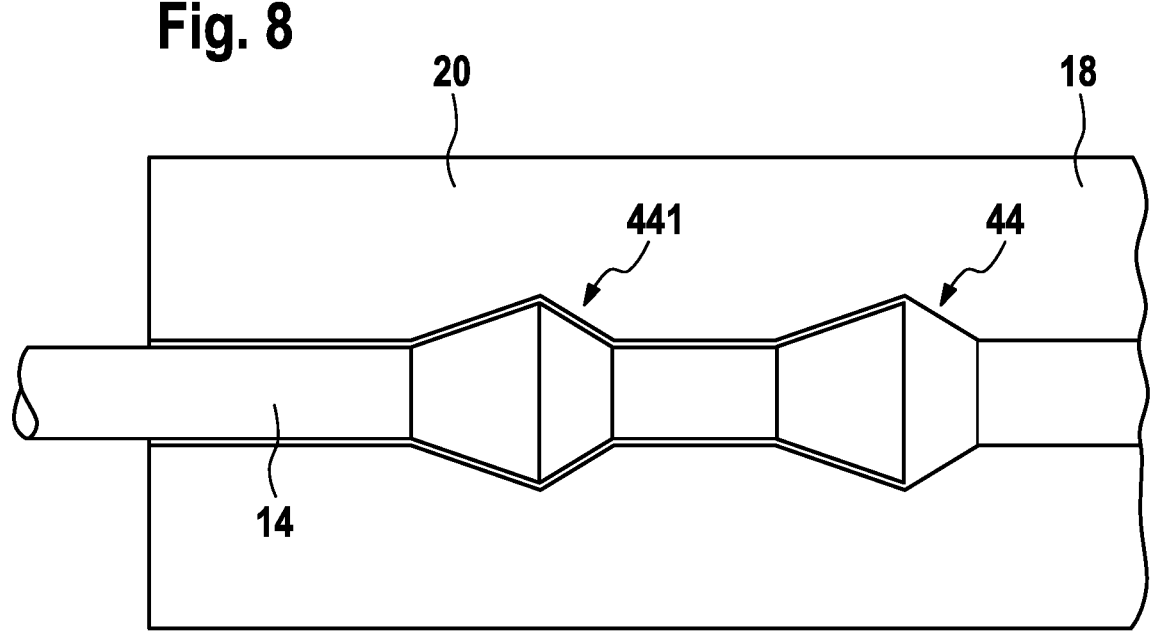
FIG. 8 is a greatly simplified schematic diagram in plan view of the illustration according to FIG. 7 but with two pockets woven into the connection mouth, the connection being expanded and therefore fixed at two points in the region of the pockets.

The procedure with the result according to FIGS. 7 and 8 corresponds to a second method. In this case, insertion and positioning of the device 40 according to the invention takes place in such a manner that the expansion sleeve 2 is located in the region of at least one cavity 16 of the connection mouth 20, embodied here for example, as pockets 44 and/or 441. If the supply tube 26 is expanded according to the invention in the region of these pockets 44, the advantage is that the supply tube 26 can be positioned, for example, so as to be resistant to displacement at both ends of the connection mouth 20. At the same time, further fastening elements such as hose clips, etc. are omitted.

With an arrangement of two pockets 44 and 441 in a row (FIG. 8), no further stretching piece 8 is required. In terms of the method, the sequence with this variant corresponds to that with one pocket 44 (FIG. 7), but with the difference that the device 40 according to the invention with the stretching piece 8 is not removed completely from the connection 14 after expansion in the region of the first pocket 44. The device 40 initially remains in the connection 14 and is merely repositioned in the region of the second pocket 441 in order to then repeat the process step "expansion".

Figure 9:
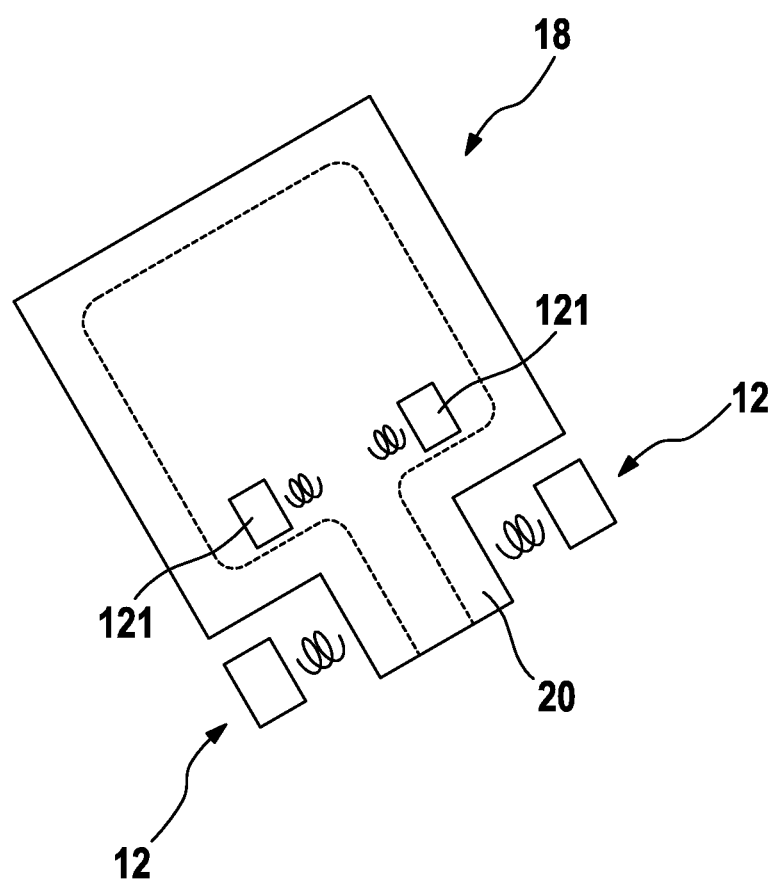
FIG. 9 is a greatly simplified schematic view of an OPW airbag with a connection mouth positioned in the region of a heating device.

FIG. 9 shows an OPW airbag 18 with a connection mouth 20 positioned in the region of a heating device 12. When carrying out the second method for fixing a connection, the heating device 12 is arranged in the region of the connection mouth 20, in order after each expansion to heat the expanded end of the connection 14 in the region of the pockets 44, 441.

If the first method for fixing a connection is carried out, a heating device 121 is to be positioned in the region of the expanded end of the connection 14 inside the OPW airbag.

LIST OF REFERENCE NUMERALS

2 Expansion sleeve
4 Expansion shell
6 Mandrel
8 Stretching piece
101 Holding device
102 Holding device
12 Heating device
121 Heating device
14 Connection 16 Cavity
18 OPW airbag
20 Connection mouth
22 Upper fabric
24 Lower fabric
26 Supply tube
28 Woven seam
30 Edge region
32 Opening
34 Arrow
36 Area
38 Arrow
40 Device
42 Screw
44 Pocket
441 Pocket

The invention claimed is:

1. Method for fixing a connection of a supply tube to one-piece woven (OPW) airbag using a device for fixing a connection to the OPW airbag comprising:
   a) an expansion sleeve (2), having
   b) a plurality of expansion shells (4), and
   c) a mandrel (6) extending lengthwise through the expansion sleeve (2) having
   d) a stretching piece (8) arranged in the vicinity of the expansion shells (4), the outer diameter of which stretching piece is greater than the inner diameter of the expansion shells (4),
   the method comprising the following steps:
   e) inserting and positioning the device in a connection (14) arranged in a connection mouth (20) of the OPW airbag so that the expansion sleeve (2) is located in the region of at least one cavity (16) of the connection mouth (20),
   f) heating the connection (14) in the region of the expansion shells (4),
   g) moving the stretching piece (8) towards the expansion sleeve (2) in the direction of the expansion shells (4) so that the shells move radially outwards and expand the connection (14) radially in the region of the stretching piece (8), in such a manner that the connection deforms thermoplastically and retains its expanded deformation on subsequently cooling down.

2. Method for fixing a connection of a supply tube to one-piece woven (OPW) airbag using a device for fixing a connection to the OPW airbag comprising:
   a) an expansion sleeve (2), having
   b) a plurality of expansion shells (4), and
   c) a mandrel (6) extending lengthwise through the expansion sleeve (2) having
   d) a stretching piece (8) arranged in the vicinity of the expansion shells (4), the outer diameter of which stretching piece is greater than the inner diameter of the expansion shells (4),
   the method comprising the following steps:
   e) inserting and positioning the device in a connection (14) arranged in a connection mouth (20) of the OPW airbag and protruding inside said OPW airbag (18) so that the expansion sleeve (2) is located in the region of a portion of the connection (14) protruding inside the OPW airbag (18),
   f) heating the connection (14) in the region of the expansion shells (4),
   g) moving the stretching piece (8) towards the expansion sleeve (2) in the direction of the expansion shells (4) so that the shells move radially outwards and expand the connection (14) radially in the region of the stretching piece (8), in such a manner that the connection deforms thermoplastically and retains its expanded deformation on subsequently cooling down.

* * * * *